United States Patent
Hayashi

(10) Patent No.: US 7,370,487 B2
(45) Date of Patent: May 13, 2008

(54) REFRIGERATING CYCLE DEVICE CAPABLE OF ENSURING OIL RETURN

(75) Inventor: Hiroyuki Hayashi, Oobu (JP)

(73) Assignee: DENSO CORPORATION, Kariya (JP)

( * ) Notice: Subject to any disclaimer, the term of this patent is extended or adjusted under 35 U.S.C. 154(b) by 490 days.

(21) Appl. No.: 11/180,511

(22) Filed: Jul. 14, 2005

(65) Prior Publication Data

US 2006/0016203 A1   Jan. 26, 2006

(30) Foreign Application Priority Data

Jul. 20, 2004   (JP) .............................. 2004-211753

(51) Int. Cl.
*F25B 1/00* (2006.01)
*F25B 49/00* (2006.01)

(52) U.S. Cl. .......................... 62/228.4; 62/157; 62/227

(58) Field of Classification Search ............... 62/228.1, 62/228.3, 228.4, 228.5, 229, 157, 231, 244, 62/227; 165/202

See application file for complete search history.

(56) References Cited

U.S. PATENT DOCUMENTS

| | | | |
|---|---|---|---|
| 6,266,967 B1 | 7/2001 | Honda | |
| 6,675,595 B2 * | 1/2004 | Ohya | 62/199 |
| 6,807,818 B2 * | 10/2004 | Yoshida et al. | 62/228.3 |
| 2004/0107716 A1 * | 6/2004 | Hirota | 62/228.5 |

FOREIGN PATENT DOCUMENTS

JP   A-2000-283576   10/2000

* cited by examiner

*Primary Examiner*—Marc Norman
(74) *Attorney, Agent, or Firm*—Posz Law Group, PLC

(57) ABSTRACT

Whether or not a flow rate of a circulating refrigerant is higher than a predetermined threshold value is judged and when the flow rate is higher than the predetermined threshold value, the discharge flow rate of a compressor 11 is controlled in accordance with the degree of cooling of a front seat evaporator 9 and when the flow rate is lower than the predetermined threshold value, the discharge flow rate of the compressor 11 is controlled so as to intermittently change between a discharge flow rate near the predetermined threshold value and a flow rate of substantially zero and the operation time of the compressor 11 during the period of that control is measured and when the compressor operation time exceeds a predetermined time, the compressor is continuously controlled in accordance with a discharge flow rate near the predetermined threshold value.

9 Claims, 8 Drawing Sheets

Fig.7
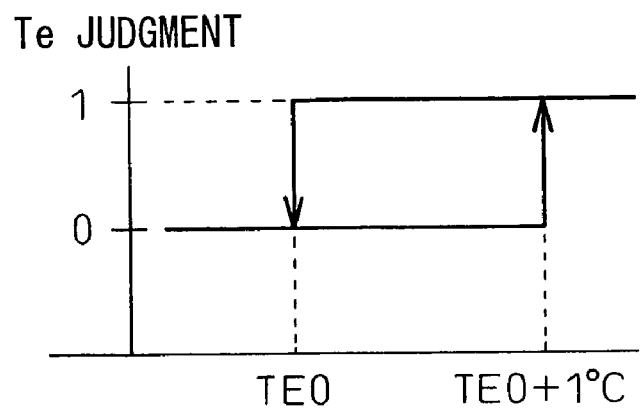
Fig.8
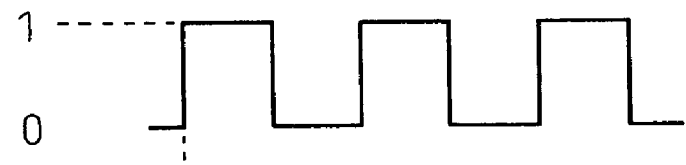
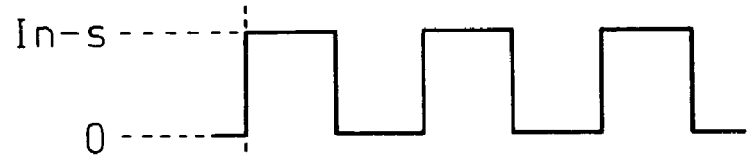
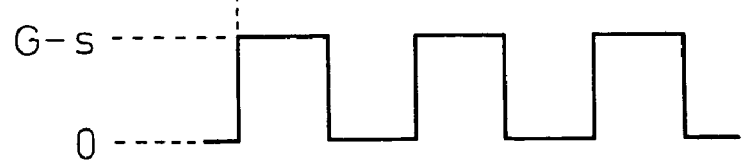

REFRIGERATING CYCLE DEVICE CAPABLE OF ENSURING OIL RETURN

BACKGROUND OF THE INVENTION

1. Field of the Invention

The present invention relates to a refrigerating cycle device comprising a compressor capable of changing the discharge flow rate thereof, specifically, a variable displacement compressor capable of changing the discharge displacement, an electric compressor capable of controlling the rotation speed, etc., and more particularly, to a control of a discharge flow rate when the flow rate of a circulating refrigerant is low.

2. Description of the Related Art

Conventionally, in a dual-type air conditioner for a vehicle comprising a front seat air conditioning unit for air-conditioning a vehicle compartment front seat zone and a rear seat air conditioning unit for air-conditioning a vehicle compartment rear seat zone, evaporators are independently provided on the front seat side and the rear seat side, respectively, but a compressor and a condenser are shared.

The rear seat evaporator is arranged more distant from the compressor than the front seat evaporator and the refrigerant pipe path is long, therefore, the pressure loss in the refrigerant pipe path inevitably becomes large. Because of this, it is likely that the refrigerant flow rate is lower in the rear seat evaporator and the flow velocity of the refrigerant is reduced compared to that in the front seat evaporator. In addition to this, the low-pressure pipe of the rear seat evaporator is arranged normally under the floor of a vehicle and in many cases it is arranged at a position lower than the compressor suction pipe.

As a result, lubricant oil gathers in the rear seat evaporator or in the low-pressure pipe at its outlet and a problem is caused that the amount of oil returned to the compressor becomes low and the durability of the compressor is adversely affected. In order to solve this problem, there is a widely known refrigerating cycle device used for an air conditioner for a vehicle, in which the operation of a fixed displacement compressor is forcedly controlled so that it operates intermittently or the lack of the amount of oil returned to the compressor is solved by forcedly changing the discharge displacement of the variable displacement compressor (for example, refer to Patent document 1).

In addition to Patent document 1 described above, based on the research and examination by the applicants of the present invention, it has been found that the lack of the amount of oil returned to the compressor becomes more conspicuous when the flow rate of the circulating refrigerant in the refrigerating cycle falls below a predetermined threshold value determined for each type of cycle and that the variations in the temperature distribution of the discharged air temperature of the evaporator become large when the flow rate of the circulating refrigerant falls below the predetermined threshold value.

However, according to Patent document 1 described above, the continuous operation time of the compressor after it is started is measured and when the continuous operation time of the compressor reaches a predetermined time, only the following control is carried out, that is, the operation of the fixed displacement compressor is controlled so that it operates intermittently or the operation of the compressor is controlled by forcedly changing the discharge displacement of the variable displacement compressor.

In other words, no control directly relating to the fall in the flow rate of the circulating refrigerant in the refrigerating cycle is carried out. Therefore, with the intention of preventing the lack of oil returned to the compressor or of improving the variations in the discharged air temperature, the applicants of the present invention have filed an application for a device characterized in that, when the flow rate of the circulating refrigerant is higher than a predetermined threshold value, the discharge flow rate of the compressor is controlled continuously in accordance with the degree of cooling of the evaporator and when the flow rate of the circulating refrigerant is lower than the predetermined threshold value, the discharge flow rate of the compressor is changed intermittently between an intermediate flow rate near the predetermined threshold value and a low flow rate lower than the predetermined threshold value (for example, refer to Japanese Patent Application No. 2003-60037).

[Patent document 1] Japanese Unexamined Patent Publication (Kokai) No. 2000-283576)

However, based on-subsequent research and an examination by the inventors of the present invention, it has been found that, in the device filed for the above-mentioned application, after the ON/OFF control of the device in which the flow rate is changed intermittently is carried out at a low flow rate near the predetermined threshold value, if the continuous control is carried out at the low flow rate near the predetermined threshold value, there appears a phenomenon that the evaporator is in a state in which the evaporation temperature overshoots immediately after the compressor is turned ON while the compressor is operated intermittently and the temperature of the evaporator falls rapidly when the control is switched to the continuous control.

In other words, as the control current for operating the compressor in order to change the discharge flow rate is fed back based on the evaporation temperature, such a measure is taken that when the evaporation temperature overshoots, the control current is increased and when the evaporation temperature falls, the control current is reduced, however, it has been found that if the evaporation temperature falls rapidly, it is difficult to control the control current so as to follow the change of the evaporation temperature.

Further, it has been found that, if the control current is difficult to control, the evaporation temperature may continue to fall and reach the frosting region or the control current may fall below the predetermined threshold value and the control is changed to a control for changing the operation intermittently, resulting in the occurrence of pressure hunting or variations in the evaporator discharged air temperature.

SUMMARY OF THE INVENTION

The above-mentioned problems being taken into account, an object of the present invention is to provide a refrigerating cycle device capable of ensuring the oil return and reducing the variations in the evaporator discharged air temperature by controlling the switching from the intermittent control to the continuous control after confirming that the change in the evaporation temperature is in a gradual state during the period of control in which the flow rate is changed intermittently.

In order to attain the above-mentioned object, the technical means according to first to ninth aspects of the present invention are employed. In other words, a refrigerating cycle device according to a first aspect of the present invention is characterized by comprising at least a compressor (11) capable of changing its discharge flow rate, and at least an evaporator (9, 27) provided on the suction side of the compressor (11) for evaporating a low-pressure refrigerant;

wherein whether or not the flow rate of the circulating refrigerant is higher than a predetermined threshold value is judged, based on an information value relating to the flow rate of the circulating refrigerant, in the refrigerating cycle device; when the flow rate of the circulating refrigerant is judged to be higher than the predetermined threshold value, the discharge flow rate of the compressor (11) is controlled in accordance with the degree of cooling of the evaporator (9, 27); and, on the other hand, when the flow rate of the circulating refrigerant is judged to be not higher than the predetermined threshold value, the discharge flow rate of the compressor (11) is controlled so as to change intermittently between a discharge flow rate near the predetermined threshold value and a discharge flow rate of substantially zero and, at the same time, the compressor operation time during the period of that control is measured and when the compressor operation time exceeds a predetermined time, the discharge from the compressor (11) is continuously controlled to a discharge flow rate near the predetermined threshold value.

According to the first aspect of the present invention, as the fact that the change in the evaporation temperature of the evaporator (9, 27) becomes gradual is noted by checking the operation time of the compressor (11) during the period of the control in which the discharge flow rate is changed intermittently, it is possible to smoothly switch from the intermittent control to the continuous control. Due to this, it is possible to follow the discharge flow rate in accordance with the degree of cooling of the evaporator (9, 27).

Further, when conditions are created under which the flow rate of the circulating refrigerant falls below the predetermined threshold value and the lack of the amount of oil returned to the compressor (11) is likely to occur, the discharge flow rate is controlled so as to change intermittently between a discharge flow rate near the predetermined threshold value and a discharge flow rate of substantially zero and, therefore, it is possible to prevent the lack of the amount of oil returned to the compressor (11) by forcedly causing the lubricant oil gathering in the evaporator (9, 27) or in the outlet pipe of the evaporator (9, 27) to flow when the discharge flow rate is higher than the predetermined threshold value.

Furthermore, as the refrigerant flows at the discharge flow rate near the predetermined threshold value, a liquid phase refrigerant is prevented from gathering in a specific portion in the internal refrigerant circuit of the evaporator (9, 27) and, therefore, the variations in the evaporator discharged air temperature can be reduced.

A second aspect of the present invention is characterized in that, when the flow rate of the circulating refrigerant is below the predetermined threshold value and while the degree of actual cooling of the evaporator (9, 27) is in a predetermined low-temperature region, the discharge flow rate of the compressor (11) is maintained at a flow rate of substantially zero and when the degree of actual cooling of the evaporator (9, 27) moves to the high-temperature region with temperature higher than the low-temperature region, the discharge flow rate of the compressor (11) is controlled to be the discharge flow rate near the predetermined threshold value. According to the second aspect it is possible to maintain the degree of actual cooling of the evaporator (9, 27) in a predetermined temperature region even if the discharge flow rate is controlled so as to change intermittently to prevent the lack of returned oil when the discharge flow rate is below the predetermined threshold value.

A third aspect of the present invention is characterized in that the compressor (11) is a flow rate control type variable displacement compressor having a control valve (110) for controlling the change in discharge displacement and variably controlling the discharge displacement using the control valve (110) so that the discharge flow rate is a target discharge flow rate; the target discharge flow rate is determined so that the degree of actual cooling of the evaporator (9, 27) is the target degree of cooling, a control means (40) for directing a control signal in accordance with the target discharge flow rate is included; the information value relating to the flow rate of the circulating refrigerant is a value of the control signal, when it is judged, based on the value of the control signal, that the flow rate of the circulating refrigerant is higher than a predetermined threshold value, the discharge displacement is controlled by applying the control signal to the control valve (110); and, on the other hand, when it is judged, based on the value of the control signal, that the flow rate of the circulating refrigerant is lower than the predetermined threshold value the discharge displacement is changed by switching the value of the control signal between a value corresponding to a flow rate near the predetermined threshold value and a value corresponding to a flow rate of substantially zero.

According to the third aspect of the present invention, in the refrigerating cycle device using a flow rate control type variable displacement compressor, based on the control signal in accordance with the target discharge flow rate, it is possible to prevent the lack of returned oil by changing the discharge displacement by switching between a value corresponding to a discharge flow rate near the predetermined threshold value and a value corresponding to a discharge flow rate of substantially zero. In other words, by using a variable displacement compressor, the function and effect of the first and second aspects can be effectively exhibited.

A fourth aspect of the present invention is characterized in that the control valve (110) produces a control pressure by using the cycle high-pressure side pressure and the change in discharge displacement is controlled by the control pressure; the flow rate of the circulating refrigerant in accordance with the control signal of the control valve (110) decreases in accordance with a rise in the cycle high-pressure side pressure; and a predetermined threshold value is corrected so as to increase in accordance with a rise in the cycle high-pressure side pressure.

According to the fourth aspect, even if the control valve (110) has the pressure-dependent control characteristic that the flow rate of the circulating refrigerant decreases in accordance with a rise in the cycle high-pressure side pressure, it is possible to carry out the flow rate control without hindrance in order to prevent the lack of returned oil when the flow rate of the circulating refrigerant is low by correcting the predetermined threshold value so as to increase in accordance with a rise in the cycle high-pressure side pressure.

A fifth aspect of the present invention is characterized in that the compressor (11) is an electric compressor controlled so that discharge flow rate is the target discharge flow rate by the control of the rotation speed of an electric motor ($11i$); the target discharge flow rate is determined so that the degree of actual cooling of the evaporator (9, 27) is the target degree of cooling, an electric motor control means (40) for directing a control signal of the rotation speed corresponding to the target discharge flow rate is included, the information value relating to the flow rate of the circulating refrigerant is the value of the control signal of the rotation speed, and when it is judged, based on the value of the control signal of the rotation speed, that the flow rate of the circulating refrigerant is higher than a predetermined threshold value, the rotation speed of the electric motor ($11i$) is controlled by applying the control signal of the rotation speed to the electric motor (11i); and, on the other hand, when it is judged, based on the value of the control signal of the rotation speed, that the flow rate of the circulating refrigerant is not higher than the predetermined threshold value the rotation speed of the electric motor (11i) is changed by switching the value of the control signal of the rotation speed between a value corresponding to a discharge flow rate near the predetermined threshold value and a value corresponding to a discharge flow rate of substantially zero.

According to the fifth aspect of the invention, in the refrigerating cycle device using the electric compressor capable of controlling the rotation speed thereof, the same function and effect as those in the above-mentioned third aspect can be exhibited by the control of the rotation speed of the electric motor (11i).

A sixth aspect of the present invention is characterized in that the degree of actual cooling of the evaporator (9, 27) is an actual discharged air temperature (Te) of the evaporator (9, 27) and the target degree of cooling is a target evaporation temperature calculated based on the information values relating to the cooling heat load conditions. According to the sixth aspect, as the information value relating to the cooling heat load conditions, a target discharge temperature (TAO) of air discharged to a vehicle compartment, an outside air temperature (Tam), etc., can be used specifically.

A seventh aspect of the present invention is characterized in that at least the evaporators (9, 27) are plural evaporators (9, 27) connected in parallel to each another and the compressor (11) is single, and the single compressor (11) circulates a refrigerant through the plural evaporators (9, 27).

According to the seventh aspect of the invention, in the refrigerating cycle device in which the plural evaporators (9, 27) are connected in parallel, oil is likely to gather in an evaporator (9, 27) among the plural evaporators (9, 27) more distant from the compressor (11) when the flow rate is low, however, even in such a refrigerating cycle device, it is possible to effectively prevent the lack of returned oil when the flow rate is low by selecting a threshold value in accordance with the device.

An eighth aspect of the present invention is a refrigerating cycle device for a vehicle characterized in that it is applied to a vehicle, and one of plural evaporators (9, 27) is arranged in the front seat air conditioning unit (1) for air-conditioning the vehicle compartment front seat side while another of the plural evaporators (9, 27) is arranged in the rear seat air conditioning unit (26) for air-conditioning the vehicle compartment rear seat side.

According to the eighth aspect of the present invention, even in such a refrigerating cycle device for a vehicle, it is possible to effectively prevent the lack of returned oil when the flow rate is low by selecting a threshold value in accordance with the device.

A ninth aspect of the present invention is characterized in that the predetermined threshold value is the minimum flow rate of the circulating refrigerant at which the variations in the discharged air temperature (Te) of the evaporator (9, 27), the pressure hunting of the compressor (11), and the oil return in the refrigerating cycle are in good condition. According to the ninth aspect, when the flow rate is low, in addition to the lack of returned oil, there are problems such as pressure hunting and variations in the discharged air temperature (Te), however, it is possible to improve these characteristics by controlling the discharge flow rate to change intermittently as shown in the first and second aspects described above.

The symbols in the parenthesis attached to each means described above indicate a correspondence with a specific means in the embodiments to be described later.

The present invention may be more fully understood from the description of the preferred embodiments of the invention set forth below, together with the accompanying drawings.

BRIEF DESCRIPTION OF THE DRAWINGS

In the drawings:

FIG. 7 is a characteristic diagram showing a judgment step of a discharged air temperature Te of an evaporator shown in FIG. 6.

FIGS. 8((a), (b) and (c)) shows time charts each showing the operation state control shown in FIG. 6.

DESCRIPTION OF THE PREFERRED EMBODIMENTS

First Embodiment

Figure 1:
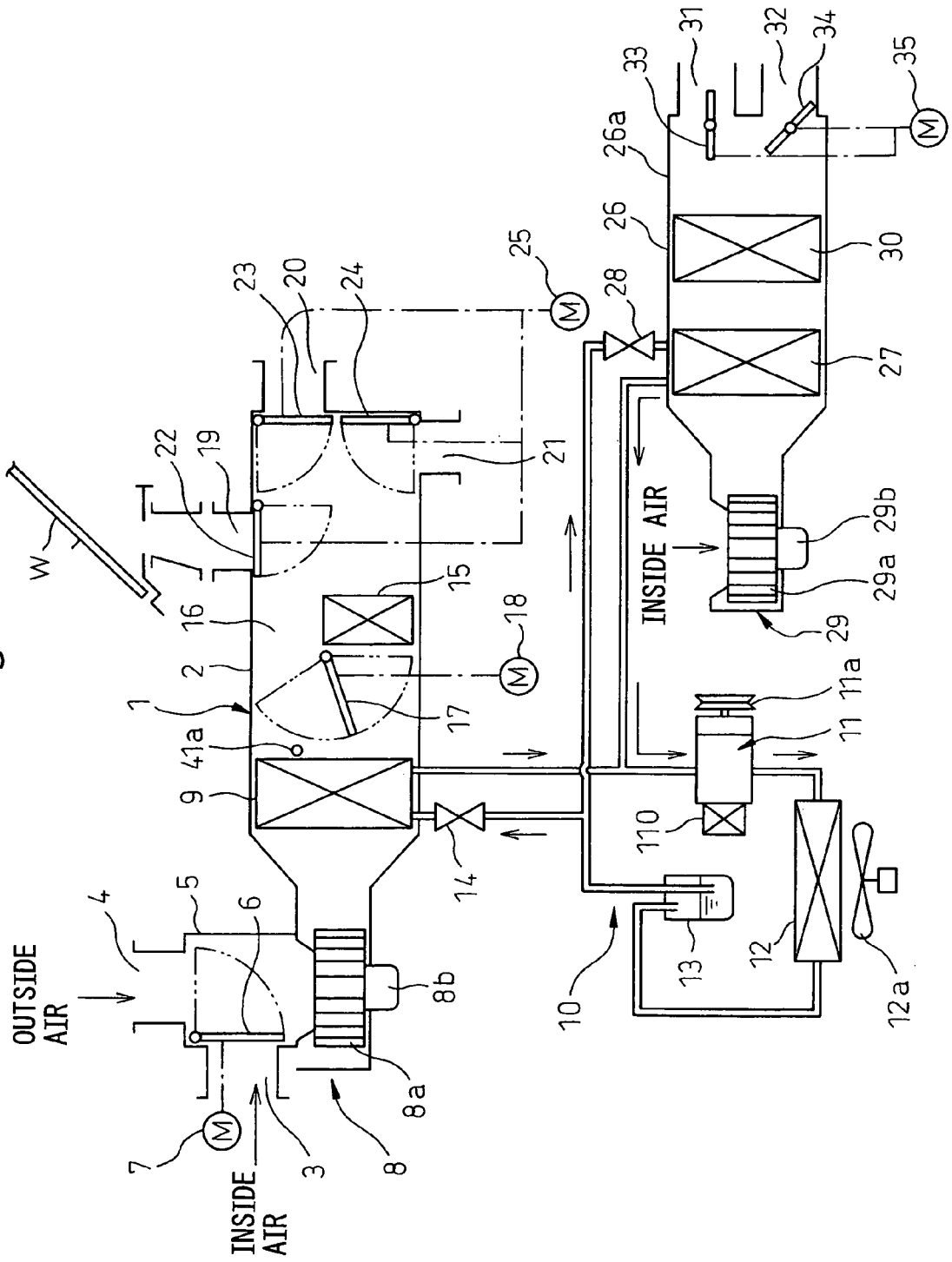
FIG. 1 is a schematic diagram showing the entire configuration of an air conditioner for a vehicle including a refrigerating cycle device in a first embodiment of the present invention.

Hereinafter, a refrigerating cycle device in a first embodiment of the present invention is explained based on FIG. 1 to FIG. 8. FIG. 1 is schematic diagram showing the entire configuration of an air conditioner for a vehicle including a refrigerating cycle device, which is an example in which the refrigerating cycle device of the present invention is applied to the air conditioner for a vehicle.

The air conditioner for a vehicle comprises a front seat air conditioning unit 1 and a rear seat air conditioning unit 26. The front seat air conditioning unit 1 is arranged in an instrument panel at the front side of a vehicle for air-conditioning the vehicle compartment front seat zone. The front seat air conditioning unit 1 has a case 2 in which an air passage through which air is discharged toward the vehicle compartment front seat side is formed. Then, at the uppermost-stream portion of the air passage in the case 2, an inside/outside air switching box 5 having an inside air introduction inlet 3 and an outside air introduction inlet 4 is arranged.

In the inside/outside air switching box 5, an inside/outside air switching door 6 is rotatably arranged as an inside/ outside air switching means. The inside/outside air switching door 6 is driven by a servo motor 7 for switching between an inside air mode for introducing inside air (air in the vehicle compartment) through the inside air introduction inlet 3 and an outside air mode for introducing outside air (air outside the vehicle compartment) through the outside air introduction inlet 4.

Then, on the downstream side of the inside/outside air switching box 5, an electric front seat fan 8 for causing a current of air to flow toward the vehicle compartment is arranged. The front seat fan 8 is designed so that a centrifugal fan 8*a* is driven by a motor 8*b*. On the downstream side of the front seat fan 8, a front seat evaporator 9 for cooling air flowing through the case 2 is arranged. The evaporator 9 is a cooling heat exchanger for cooling air supplied from the fan 8 and is one of the elements constituting a refrigerating cycle device 10.

The refrigerating cycle device 10, which is widely known, is formed so that a refrigerant circulates from the discharge side of a compressor 11 into the front seat evaporator 9 via a condenser 12, a receiver 13, and a front seat temperature-sensitive expansion valve 14 forming a front seat pressure-reducing means. Further, between the outlet of the receiver 13 and the suction side of the compressor 11, a rear seat temperature-sensitive expansion valve 28 forming a rear seat pressure-reducing means and a rear seat evaporator 27 are provided in parallel to the front seat temperature-sensitive expansion valve 14 and the front seat evaporator 9 so that the refrigerant circulates, in parallel, to the front seat evaporator 9 and the rear seat evaporator 27.

Furthermore, in the refrigerating cycle device 10, the refrigerant is compressed into a high-temperature and high-pressure state by the compressor 11 and the high-pressure gas refrigerant discharged from the compressor 11 is introduced into the condenser (heat radiator) 12, and in the condenser 12, the gas refrigerant exchanges heat with the outside air supplied from a cooling electric fan 12*a* and radiates heat and condenses. The refrigerant having passed through the condenser 12 is separated into a liquid phase refrigerant and a gas phase refrigerant in the receiver 13 and the liquid phase refrigerant is stored in the receiver 13.

Then, the high-pressure liquid refrigerant from the receiver 13 is reduced in pressure into a low-pressure liquid-gas two-phase state by the front seat temperature-sensitive expansion valve 14 and the low-pressure refrigerant reduced in pressure absorbs heat from conditioned air and evaporates in the front seat evaporator 9. Similarly, the high-pressure liquid refrigerant from the receiver 13 is reduced in pressure into a low-pressure gas-liquid two-phase state by the rear seat temperature-sensitive expansion valve 28, flows into the rear seat evaporator 27, and the low-pressure refrigerant absorbs heat from conditioned air and evaporates in the rear seat evaporator 27. The gas refrigerant, having evaporated in the front and rear evaporators 9 and 27, is sucked by the compressor 11 again and compressed.

As is widely known, the front and rear temperature-sensitive expansion valves 14 and 28 automatically adjust the valve opening degree so that the degree of superheat of the refrigerant at the outlets of the evaporators 9 and 27 is maintained at a predetermined value. Such devices as the compressor 11, the condenser 12, and the receiver 13 of the refrigerating cycle device 10 are arranged within an engine compartment (not shown).

On the other hand, in the front seat air conditioning unit 1, on the downstream side of the front seat evaporator 9, a front seat heater core 15 for heating air flowing through the case 2 is arranged. The heater core 15 is a heating heat exchanger for heating air (cool air) having passed through the evaporator 9 by using hot water (engine cooling water) of a vehicle engine and at the side thereof, a bypass passage 16, through which air flows while bypassing the heater core 15, is formed.

Further, an air mix door 17 is rotatably arranged between the front seat evaporator 9 and the heater core 15. The air mix door 17 is driven by the servo motor 18 and the position of rotation (opening degree) can be adjusted continuously. By the opening degree of the air mix door 17, the flow rate of air (flow rate of hot air) passing through the heater core 15 and the flow rate of air (flow rate of cool air) passing through the bypass passage 16 while bypassing the heater core 15. Due to this, the temperature of air discharged to the vehicle compartment front seat side is adjusted.

At the farthest end of the downstream of the air passage of the case 2, three kinds of discharge outlet are provided, that is, a defroster discharge outlet 19 from which conditioned air is discharged toward a windshield W of a vehicle, a front seat face discharge outlet from which conditioned air is discharged toward the upper body of a passenger, and a front seat foot discharge outlet 21 from which conditioned air is discharged toward the feet of a passenger.

Then, on the upstream side of each of the discharge outlets 19, 20, and 21, a defroster door 22, a front seat face door 23, and a front seat foot door 24 are rotatably arranged. These doors 22, 23, and 24 are opened/closed by a common servo motor 25 via a link mechanism, not shown.

Next, a rear seat air conditioning unit 26 is explained. The rear seat air conditioning unit 26 is arranged on the rear side in a vehicle compartment so as to air-condition the rear seat zone in the vehicle compartment. The rear seat air conditioning unit 26 has a case 26*a* forming an air passage and on the upstream side of the case 26*a*, a rear seat fan 29 for sucking and supplying inside air (air in a vehicle compartment) is arranged. The rear seat fan 29 is designed so that a centrifugal fan 29*a* is driven by a motor 29*b*. Further, on the downstream side of the rear seat fan 29, a rear seat evaporator 27 is arranged for cooling air flowing through the case 26*a*.

On the downstream side of the rear seat evaporator 27, a rear seat heater core 30 for heating air using hot water of a vehicle engine as a heat source is arranged and on the downstream side of the rear seat heater core 30, a rear seat face discharge outlet 31 from which conditioned air is discharged toward the upper body of a passenger in the rear seat and a rear seat foot discharge outlet 32 from which conditioned air is discharged toward the feet of a passenger in the rear seat are provided.

Then, a rear seat face door 33 for opening/closing the rear seat face discharge outlet 31 and a rear sear foot door 34 for opening/closing the rear seat foot discharge outlet 32 are rotatably arranged and both the doors 33 and 34 are opened/closed by a common servo motor 35 via a link mechanism, not shown.

Next, the compressor 11 is explained. The compressor 11 is rotatably driven by the rotating force of a vehicle engine (not shown) transferred via a pulley 11*a*, a belt (not shown), etc. The compressor 11 in the present embodiment is a variable displacement compressor capable of continuously and variably controlling the discharge displacement by a control signal from the outside. Specifically, it is possible to change the compressor discharge displacement continuously in the range from substantially 0% to 100% by controlling the pressure in a swash plate chamber using the discharge pressure and the suction pressure in a swash plate type compressor and by changing the stroke of a piston by changing the inclination angle of the swash plate.

Such a swash plate type variable displacement compressor is widely known. In the present embodiment, among swash plate type variable displacement compressors, particularly a flow rate control type variable displacement compressor, which is widely known such as in Japanese Unexamined Patent Publication (Kokai) No. 2001-107854, is used as the compressor 11.

Figure 2:
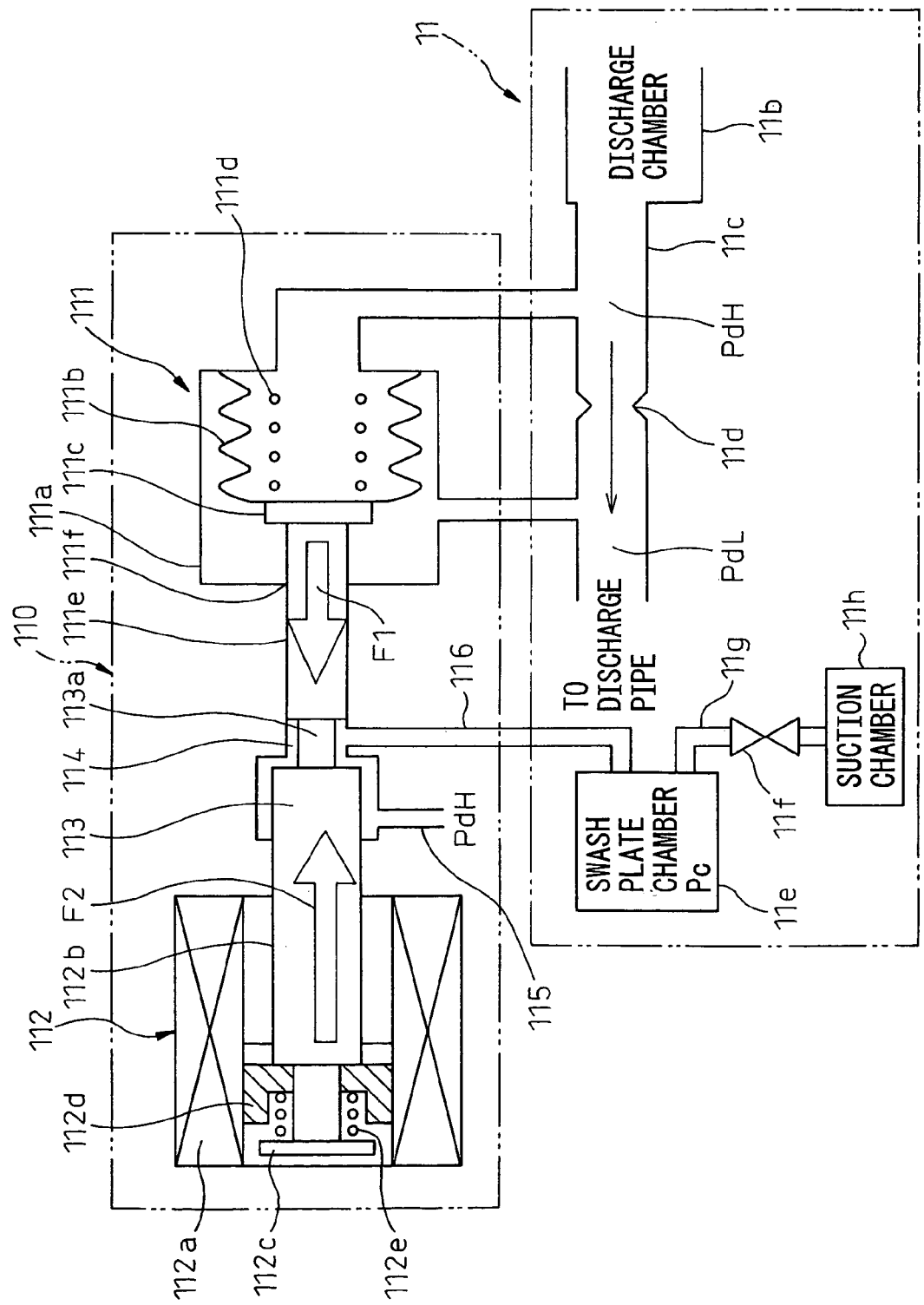
FIG. 2 is a schematic diagram showing the general configuration of a discharge side channel portion of a variable displacement compressor and a control valve portion of a pressure control valve in a swash plate chamber in the first embodiment of the present invention.

The flow rate control type variable displacement compressor 11 is explained based n FIG. 2. FIG. 2 is a schematic diagram showing a general configuration of the discharge side channel of the variable displacement compressor 11 and a control valve 110, that is a pressure control valve in a swash plate chamber, and a discharge chamber 11b of the compressor 11 is a portion for gathering the refrigerant discharged from plural piston operation chambers (cylinders), not shown, and for smoothing the discharge pulsation.

A throttle 11d is provided in an outlet channel 11c of the discharge chamber 11b so that when the refrigerant discharged from the compressor 11 passes through the throttle 11d, a predetermined differential pressure P is produced between before and after the throttle 11d. Here, differential pressure P=PdH−PdL, where PdH is the refrigerant pressure at the upstream side of the throttle 11d and PdL is the refrigerant pressure at the downstream side of the throttle 11d.

As described by Bernoulli's law, the differential pressure P is in a proportional relationship with the flow rate of refrigerant discharged from the compressor 11 and, therefore, it is possible to control the flow rate of refrigerant discharged form the compressor 11 by controlling the differential pressure P. On the other hand, the control valve 110 comprises a differential-pressure-responsive mechanism 111 for generating a force F1 in accordance with the differential pressure P described above and an electromagnetic mechanism for generating an electromagnetic force F2 that opposes the F1 of the differential-pressure-responsive mechanism 111, thereby the position of a valve body 113 (in the leftward and rightward directions in FIG. 2) is changed by the balance between the force F1 in accordance with the differential pressure P and the electromagnetic force F2.

Further, the differential-pressure-responsive mechanism 111 accommodates a bellows 111b capable of elastically expanding and contracting in the movement direction (in the leftward and rightward directions in FIG. 2) of the valve body 113 within a case 111a and the refrigerant pressure PdH at the upstream side of the throttle 11d is introduced to the inside of the bellows 111b. On the other hand, to the inside of the case 111a, the refrigerant pressure PdL at the downstream side of the throttle 11d is introduced.

Then, the right end of the bellows 111b shown in FIG. 2 forms a fixed end fixed to the case 111a and the left end of the bellows 111b shown in FIG. 2 forms a movable end 111c that moves in the leftward and rightward directions in FIG. 2 by elastic expanding and contracting actions. Within the bellows 111b, a spring 111d for pressing the bellows 111b toward the expanding direction (in the leftward direction in FIG. 2) is provided.

Furthermore, to the movable end 111c of the bellows 111b, a push rod 111e is integrally linked. The push rod 111e is inserted into an insertion hole 111f of the case 111a, both slidably and hermetically sealed by means of a seal mechanism, not shown, and extends to the outside of the case 111a.

On the other hand, the electromagnetic mechanism 112 has an electromagnetic coil 112a and a plunger 112b is movably arranged in the axis direction (in the leftward direction in FIG. 2) in an inner peripheral side of the electromagnetic coil 112a. At the end of the plunger 112b, a movable iron core 112c is integrally formed, and a fixed iron core 112d is arranged in opposition to the movable iron core 112c and the electromagnetic force (attraction force) F2 in accordance with the control current In supplied to the electromagnetic coil 112a is produced between the movable iron core 112c and the fixed iron core 112d.

Further, between the movable iron core 112c and the fixed iron core 112d, a spring 112e for producing a spring force in the opposite direction of the electromagnetic force (attraction force) F2 is arranged. At the end (the right end in FIG. 2) of the plunger 112b on the opposite side of the movable iron core 112c, the above-mentioned valve body 113 is integrally formed.

Furthermore, the valve body 113 is integrally linked to the push rod 111e via a link shaft 113a having a diameter sufficiently smaller than that of the valve body 113. Therefore, the plunger 112b, the valve body 113, and the push rod 111e constitute a single body and they move in the axis direction of the plunger 112b (in the leftward direction in FIG. 2) as a single body.

The valve body 113 is arranged in a control pressure passage 114 and increases or decreases the passage area of the control pressure passage 114. As one end of the control pressure passage 114 communicates with the discharge chamber 11b of the compressor 11 via a communication passage 115, the refrigerant pressure PdH at the upstream side of the throttle 11d is introduced to the one end of the control pressure passage 114. On the other hand, the other end of the control pressure passage 114 communicates with a swash plate chamber 11e of the compressor 11 via the communication passage 116.

Then, the swash plate chamber lie communicates with a suction chamber 11h of the compressor 11 via a communication passage 11g having a throttle 11f. When moving in the rightward direction in FIG. 2, the valve body 113 decreases the passage area of the control pressure passage 114 and when moving in the leftward direction, increases the passage area of the control pressure passage 114. Therefore, the electromagnetic force F2 is a force in the valve closing direction for moving the valve body 113 in the rightward direction in FIG. 2 and conversely, the force F1 in accordance with the differential pressure P is a force in the valve opening direction for moving the valve body 113 in the leftward direction in FIG. 2.

When the passage area of the control pressure passage 114 decreases, the flow rate of the refrigerant, which is discharged from the discharge chamber 11b of the compressor 11, flowing through the communication passage 115, the control pressure passage 114, and a communication passage 116 and flowing into the swash plate chamber 11e, decreases and the pressure in the swash plate chamber 11e, that is, the control pressure Pc falls, and conversely, when the passage area of the control pressure passage 114 increases, the flow rate of the refrigerant that flows into the swash plate chamber 11e increases and therefore the control pressure Pc in the swash plate chamber 11e increases.

In the swash plate type variable displacement compressor 11, as is widely known, a discharge displacement changing mechanism is configured so that when the control pressure Pc falls, the inclination angle of the swash plate increases, the piston stroke increases, and the discharge displacement increases, and conversely, when the control pressure Pc increases, the inclination angle of the swash plate decreases, the piston stroke decreases, and the discharge displacement decreases.

The electromagnetic force F2 is a force opposing the force. F1 in accordance with the differential pressure P and, therefore, the increase or decrease in the electromagnetic force F2 determines the target differential pressure and the control pressure Pc in the swash plate chamber 11e is controlled so that the actual differential pressure P is the target differential pressure P determined by the electromagnetic force F2 and thereby the discharge displacement is changed. Further, the differential pressure P and the discharged refrigerant flow rate are in a proportional relationship as described above and, therefore, to determine the target differential pressure is to determine the target discharged refrigerant flow rate.

Figure 3:
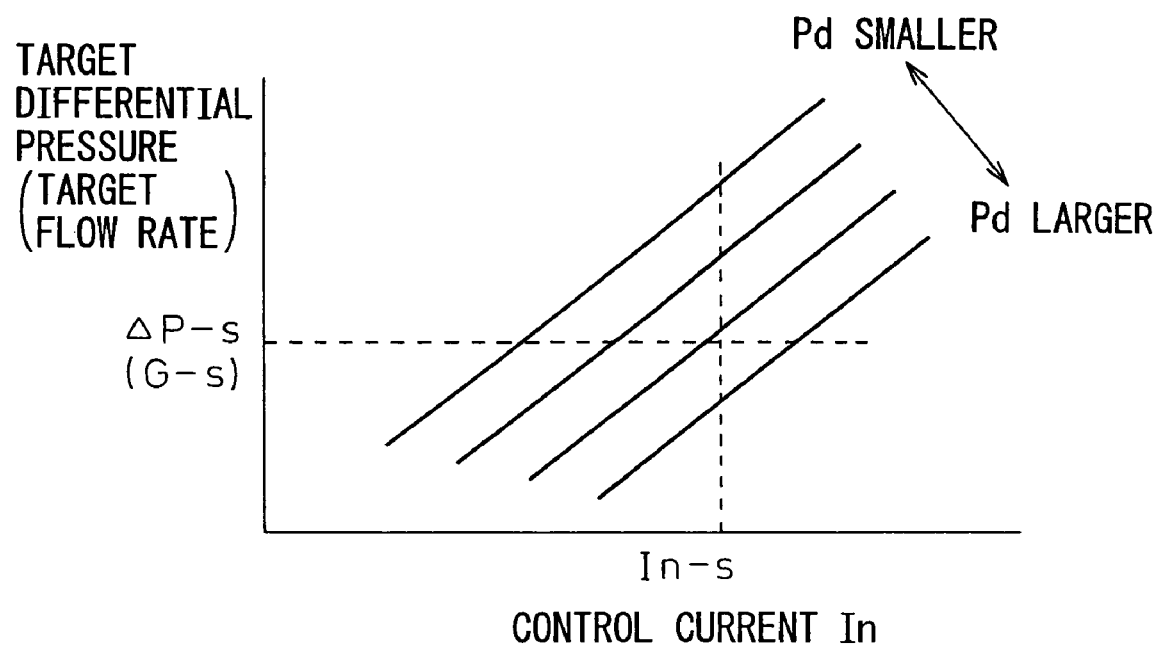
FIG. 3 is a characteristic diagram showing a relationship between the target differential pressure and the control current of the variable displacement compressor in the first embodiment of the present invention.

Then, as the electromagnetic force F2 is determined in accordance with the control current In supplied to the electromagnetic coil 112a, the target differential pressure and the target discharged refrigerant flow rate increase in accordance with the increase in the control current In as in a relationship shown in FIG. 3. Specifically, it is normal to change the control current In by duty control because of the configuration of the current control circuit, however, it may be possible to directly and continuously (in an analog manner) change the value of the control current In without using the duty control.

In a swash plate type variable displacement compressor 11, it is possible to continuously change the discharge displacement from 100% to substantially 0% by adjusting the control pressure Pc. Then, by reducing the discharge displacement as low as substantially 0%, the compressor substantially enters an operation stop state. Therefore, a clutch-less configuration is possible in which the rotating shaft of the compressor 11 is always linked to the pulley on the vehicle engine side via the pulley 11a and a belt (not shown). However, another configuration may be possible in which the transfer of power to the compressor 11 is carried out intermittently by an electromagnetic clutch (not shown), mounted to the rotating shaft of the compressor 11, as the need arises.

Figure 4:
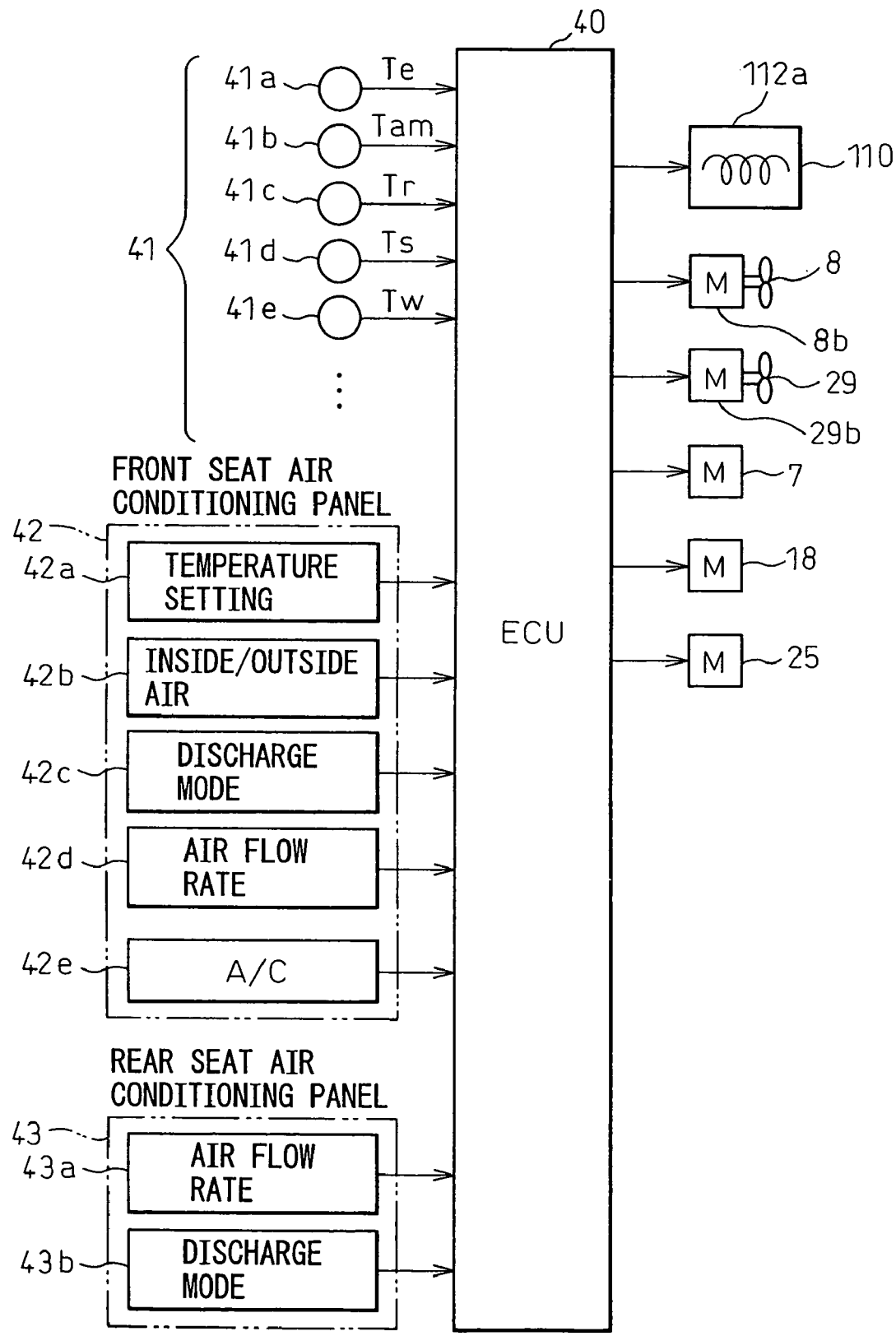
FIG. 4 is a block diagram showing the general configuration of an electric control section in the first embodiment of the present invention.

Next, an air conditioning control unit 40, which is a control means in the present embodiment, is explained based on FIG. 4. First, as shown in FIG. 4, the air conditioning control unit 40 comprises a widely known microcomputer including a CPU, a ROM, a RAM, etc., and peripheral devices and, in its ROM, a control program for air conditioning control is provided, that is, the air conditioning control unit 40 is an electric control section for carrying out various calculations and processes based on the control program.

To the input of the air conditioning control unit 40, sensor detection signals from a sensor group 41, operation signals from a front seat air conditioning panel 42, and operation signals from a rear seat air conditioning panel 43 are input. In the sensor group 41, a front seat evaporator temperature sensor 41a, arranged at the air discharge outlet of the front seat evaporator 9 for detecting a front seat evaporator discharged air temperature Te, is provided and, in addition to the front seat evaporator temperature sensor 41a, various sensors 41b to 41e for detecting outside air temperature Tam, inside air temperature Tr, quantity of solar radiation Ts, hot water temperature Tw, etc. are provided.

The front seat air conditioning panel 42 is arranged in the vicinity of an instrument panel (not shown) in front of the driver's seat in a vehicle compartment and has the following switches 42a to 42e to be operated by a passenger. A temperature setting switch 42a outputs a signal for setting the temperature in the front seat zone in a vehicle compartment and an inside/outside air switching switch 42b outputs a signal for manually setting the inside air mode and the outside air mode by using the inside/outside air switching door 6.

A discharge mode switch 42c outputs a signal for manually setting a face mode, bilevel mode, foot mode, foot defroster mode, and defroster mode widely known as discharge modes for discharging air to the front seat. An air flow rate switching switch 42d outputs a signal for turning on/off the front seat fan 8 and manually setting air flow rate switching of the front seat fan 8.

An air conditioning switch 42e switches between the operation state and the stop state of the compressor 11 and when the air conditioning switch 42e is turned off, the discharge displacement of the compressor 11 is reduced to substantially zero displacement by forcedly reducing the control current In of the control valve 110 to zero, whereby the compressor 11 is substantially brought into the stop state. When the air conditioning switch 42e is turned on, a state is brought about in which a predetermined amplitude of the control current In, calculated by the air conditioning control unit 40, is output to the control valve 110.

On the other hand, the rear seat air conditioning panel 43 is arranged in the rear seat zone etc. in a vehicle compartment and comprises a rear seat air flow rate switching switch 43a and a rear seat discharge mode switch 43b. The rear seat air flow rate switching switch 43a outputs a signal for turning on/off the rear seat fan 29 and for manually setting the air flow rate switching of the rear seat fan 29. The rear seat discharge mode switch 43b outputs a signal for manually setting the face mode, the bilevel mode, and the foot mode widely known as the rear seat discharge modes.

Then, to the output of the air conditioning control unit 40, the electromagnetic coil 112a of the displacement control valve 110 of the compressor 11, the servo motors 7, 18, and 25 forming the electrical drive means of each device, the motor 8b of the front seat fan 8, the motor 29b of the rear seat fan 29, etc., are connected and the operations of these devices are controlled by the output signal of the air conditioning control unit 40.

Next, the operation of the refrigerating cycle device 10 in the present embodiment having the above-mentioned configuration is explained below. First, when both the front seat air conditioning unit 1 and the rear seat air conditioning unit 26 are operated, the air flow rate switching switch 42d of the front seat air conditioning panel 42 and the rear seat air flow rate switching switch 43a of the rear seat air conditioning panel 43 are turned on to operate both the front and the rear fans 8 and 29, thus supplying air to both the air conditioning units 1 and 26.

Then, when the air conditioning switch 42e, which is a compressor operating switch of the front seat air conditioning panel 42, is turned on, a state is brought about in which the predetermined control current In calculated by the air conditioning control unit 40 is output to the control valve 110 of the compressor 11 and the compressor 11 is rotatably driven by a vehicle engine in a predetermined discharge displacement state, and thus the compressor 11 is brought into the operation state. The calculation of the control current In is described in detail based on the flow chart in FIG. 6 to be described later.

As a result, the refrigerant circulates, in parallel, through the front and rear evaporators 9 and 27 in the refrigerating cycle device 10 by the operation of the compressor 11. Due to this, it is possible for the front seat air conditioning unit 1 to cool and dehumidify air to be supplied by the front seat evaporator 9 and to discharge conditioned air into the front seat side space in a vehicle compartment. Similarly, it is also possible for the rear seat air conditioning unit 26 to cool and dehumidify air to be supplied by the rear seat evaporator 27 and discharge conditioned air into the rear seat space in a vehicle compartment.

When the front and rear air conditioning units 1 and 26 are both in the simultaneous operation as described above, the front and rear temperature-sensitive expansion valves 14 and 28 are each adjusted to a valve opening degree in accordance with the cooling heat load of the front and rear evaporators 9 and 27 and the refrigerant at a flow rate in accordance with the cooling heat load always passes through the channel of each of the evaporators 9 and 27. Due to this, the degree of superheat of the refrigerant at the outlet of each of the evaporators 9 and 27 is adjusted to a predetermined value.

Next, when the rear seat air conditioning unit 26 is stopped and only the front seat air conditioning unit 1 is operated, only the front seat air flow rate switching switch 42d is turned on and the rear seat air flow rate switching switch 43a is kept in the stop state. Due to this, the rear seat fan 29 is stopped and, as air is not supplied to the rear seat evaporator 27, the refrigerant at the outlet of the rear seat evaporator 27 is brought into a saturated state in accordance with the atmospheric temperature and therefore the degree of superheat is not possessed.

As a result, the rear seat temperature-sensitive expansion valve 28 is brought into a valve-closed state or nearly into a valve-closed state, the circulation of the refrigerant through the rear seat evaporator 27 is stopped in the refrigerating cycle device 10 and the refrigerant circulates only through the front seat evaporator 9.

Figure 5:
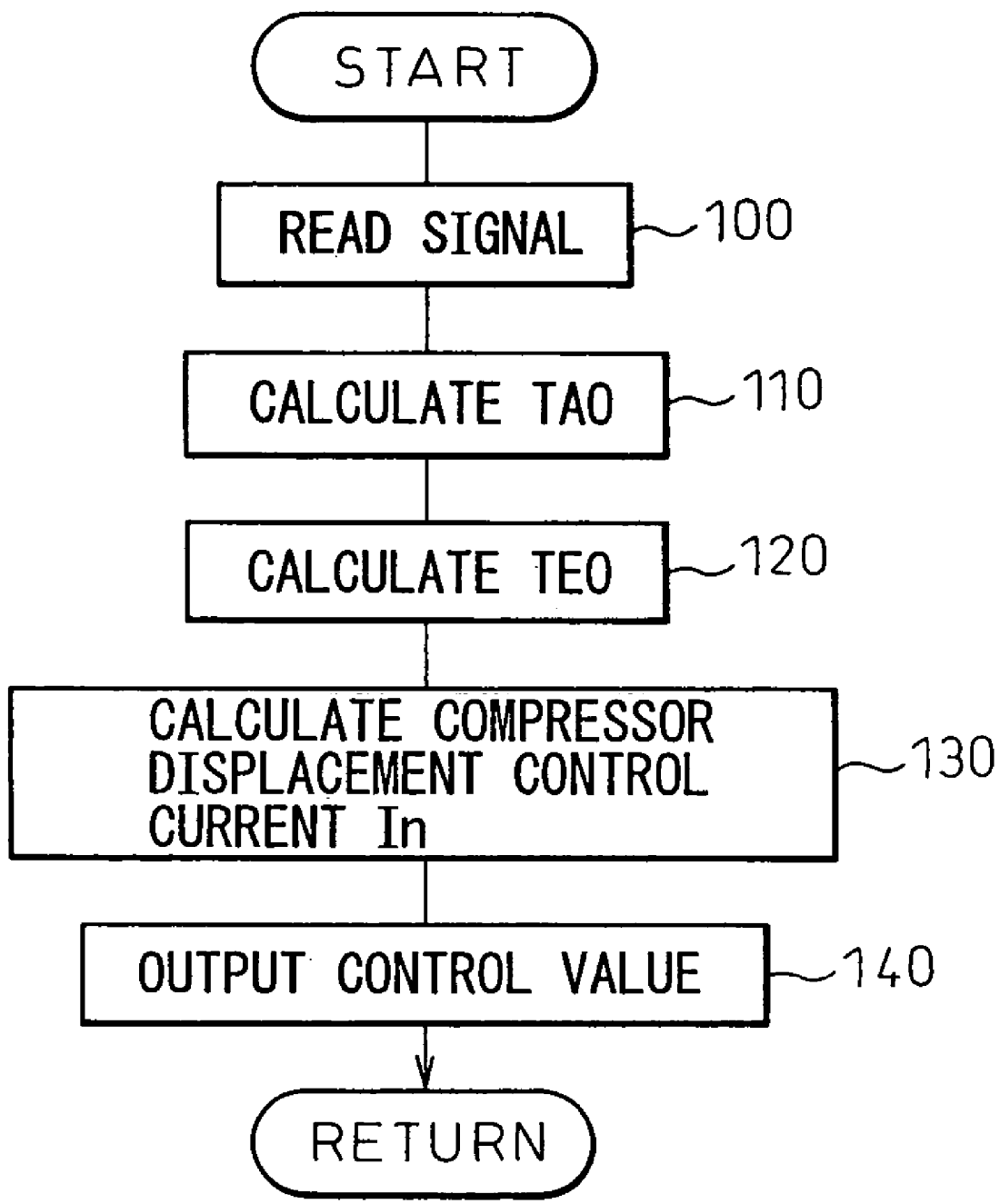
FIG. 5 is a flow chart showing a control process of the whole displacement control of an air conditioning unit in the first embodiment of the present invention.
Figure 6:
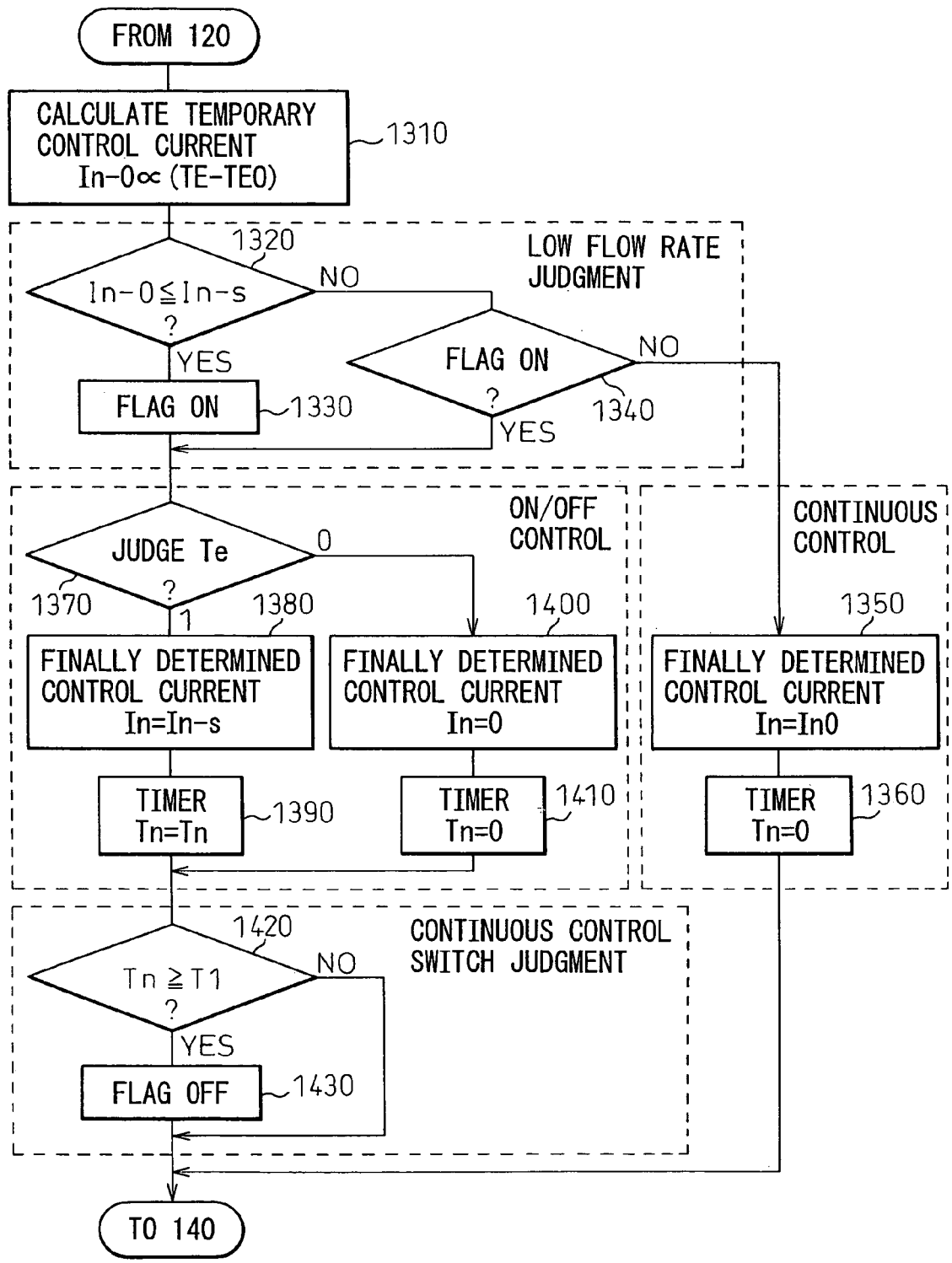
FIG. 6 is a flow chart showing the control process for calculating a compressor control current In shown in FIG. 5.

Next, the displacement control carried out by the air conditioning control unit 40 is explained based on FIG. 5 and FIG. 6. First, as shown in FIG. 5, in step 100, detection signals of the sensor group 41, operation signals of the operation panels 42 and 43, etc., are read. Then, in step 110, a target discharge temperature TAO of air discharged to the front seat in a vehicle compartment is calculated.

The target discharge temperature TAO is the temperature of air discharged to the front seat in a vehicle compartment necessary to maintain the front seat zone in a vehicle compartment at a set temperature Tset set by a passenger using the temperature setting switch 42a of the front seat operation panel 42 regardless of the air conditioning heat load variations and, as is widely known, the TAO is calculated based on the set temperature Tset, the outside air temperature Tam, the inside air temperature Tr, and the quantity of solar radiation Ts.

Next, in step 120, a target evaporator temperature TEO of the front seat evaporator 9 is calculated. The target evaporator temperature TEO is the target temperature of air discharged from the front seat evaporator and is finally calculated as the lower of a first target evaporator temperature TEO1 determined for controlling the temperature in a vehicle compartment based on the above-mentioned TAO and a second target evaporator temperature TEO2 determined based on the above-mentioned outside temperature Tam. In other words, TEO=MIN (TEO1, TEO2).

Specifically, the first target evaporator temperature TEO1 is determined so as to rise as the above-mentioned TAO rises. When the outside temperature Tam rises above an intermediate temperature region (for example, near 20° C.), the need of the dehumidifying function in order to ensure the windshield defogging performance is reduced and, therefore, the second target evaporator temperature TEO is raised to reduce the drive power of the compressor 11 and, thus the power of a vehicle engine can be saved. On the other hand, in a low temperature region in which the outside temperature Tam is below the intermediate temperature region, the second target evaporator temperature TEO is reduced to ensure the windshield defogging performance by the dehumidifying function of the evaporators 9 and 27.

Next, in step 130, the control current In for compressor displacement control is calculated. The control current In determines, as shown in FIG. 3, the target differential pressure (target flow rate) P at the displacement control valve 110 of the compressor 11 and basically, the control current In is determined so that the actual front seat evaporator discharged air temperature Te detected by the evaporator discharge temperature sensor 41a is the target evaporator temperature TEO, and the specific method for calculating the control current In is described later using FIG. 6. In step 140, the above-mentioned control current In is output to the coil 112a of the displacement control valve 110 and the displacement control of the compressor 11 is thus carried out.

Next, FIG. 6 is a diagram of a control process showing a specific example of step 130 for calculating the control current In in the basic control routine in FIG. 5. First, as shown in FIG. 6, in step 1310, a temporary control current value In-0 is calculated based on the deviation En between the actual evaporator discharged air temperature Te and the target evaporator temperature TEO. More specifically, the deviation En (En=Te−TEO) is calculated and based on the deviation En, the temporary control current value In-0 for making Te to closer TEO is calculated by the method of feedback control by proportional integral control (PI control).

Then, in step 1320, whether or not the calculated temporary control current value In-0 is smaller than a predetermined threshold value In-s is judged. Then, when the temporary control current value In-0 is smaller than the predetermined threshold value In-s, in step 1330, the flag is set to ON. In other words, when the flag is OFF, it means that continuous control is being carried out currently, and in this case, the flag is set to ON to switch the control to the ON/OFF control. When the flag is ON, it means that the ON/OFF control is being carried out currently, and in this case, the ON/OFF control is kept operating.

On the other hand, when the temporary control current value In-0 is greater than the predetermined threshold value In-s, in step 1340, whether or not the flag is in the ON state is judged and when it is judged to be in the ON state, the flow chart advances to step 1370 and when it is judged not to be in the ON state, the flow chart advances to step 1350. In step 1340, when the flag is ON, it means the ON/OFF control is in operation currently and at this time, the current ON/OFF control is kept operating. Then, when the flag is OFF, it means that continuous control is in operation currently, and in this case, the current continuous control is kept operating.

The control process from step 1320 to step 1330 is a low flow rate judgment means for judging whether or not the calculated temporary control current value In-0 is a low flow rate lower than the predetermined threshold value In-s and for setting the flag to ON so as to carry out the ON/OFF control when the judgment result is a low flow rate and to carry out the continuous control when the judgment result is not a low flow rate.

The predetermined threshold value In-s, which is the judgment value in step 1320, is a threshold value of a flow rate at which the lack of the amount of oil returned to the compressor becomes conspicuous, and has the characteristics shown in FIG. 3. In other words, the threshold value is obtained based on the characteristics that, as the control current In increases, the target differential pressure (target flow rate) also increases in proportion to the control current In and the high pressure Pd on the cycle side. That is, it has the characteristics that even if the predetermined threshold value In-s is the same, as the high pressure Pd on the cycle side increases, the target differential pressure (target flow rate) decreases.

In order to maintain the target differential pressure (target flow rate) at the predetermined threshold value ΔP-s or G-s, it is necessary to increase the predetermined threshold value In-s of the control current In in accordance with the rise in the high pressure Pd. Further, as can be seen from the characteristic diagram shown in FIG. 3, as the threshold value In-s determines the predetermined target differential pressure ΔP-s, or the predetermined target flow rate G-s, the fact that the flow rate of the temporary control current value In-0 is higher than the predetermined threshold value In-s means a state in which the compressor discharged refrigerant flow rate (mass flow rate) is higher than the predetermined threshold value In-s.

In the present embodiment, the predetermined threshold value G-s is set based on the minimum flow rate of the circulating refrigerant at which the variations in the discharged air temperature Te of each of the evaporators 9 and 27, the pressure hunting of the compressor 11, and the oil return in the refrigerating cycle are in good condition.

The fact that the low flow rate of the temporary control current value In-0 is lower than the predetermined threshold value In-s means a state in which the compressor discharged refrigerant flow rate (mass flow rate) is lower than the predetermined threshold value In-s and at such a low flow rate, the lack of oil return becomes conspicuous. The threshold value In-s varies depending on the specifications of the refrigerating cycle device 10 and corresponds to, for example, a flow rate of about 20 to 60 kg/h in the case of the air conditioning device for a vehicle in the present embodiment.

Then, if the flag is OFF in step 1340, the finally determined control current value In is determined as the temporary control current value In-0 in step 1350 and in step 1360, the timer is reset to "0". Due to this, the temporary control current value In-0 is output to the coil 112a of the displacement control valve 110 and, based on the temporary control current value In-0, the target differential pressure or the target flow rate is determined.

As a result, the discharge displacement of the compressor 11 is variably controlled so that the actual differential pressure P (PdH−PdL) is the target differential pressure determined based on the temporary control current value In-0. In other words, the discharge displacement of the compressor 11 is controlled so that the actual compressor discharge flow rate is the target flow rate determined based on In-0. Then, the control of the compressor discharge flow rate by the control current value of the displacement control valve 110 increases or decreases the cooling performance of the front seat evaporator 9 and makes it possible to maintain the actual discharged air temperature Te of the front seat evaporator 9 at the target discharge temperature TEO.

In the rear seat evaporator 27 also, the control of the compressor discharge flow rate by the control current value of the displacement control valve 110 increases or decreases the cooling performance thereof as in the front seat evaporator 9 and, therefore, it is also possible to control the actual discharged air temperature of the rear seat evaporator 27 similarly to the control of the discharged air temperature Te of the front seat evaporator 9. Step 1350 and step 1360 are referred to as a continuous control.

On the other hand, in step 1320 to step 1340, when the ON/OFF control is in operation, in step 1370, whether or not the actual discharged air temperature Te of the front seat evaporator 9 is higher than the target discharge temperature TEO is judged. Specifically, as shown in FIG. 7, the judgment threshold values of the judgment means have a predetermined hysteresis width (for example, about 1° C.), and when the actual discharged air temperature Te becomes higher than TEO+1° C., the judgment result is "1" and when Te becomes lower than TEO, the judgment result is "0". Therefore, "1" of the judgment result means that Te is higher than TEO and "0" of the judgment result means that Te is lower than TEO.

Then, when the judgment result is "1", the finally determined control current value In is taken as the threshold value In-s in step 1380. Then, a timer, not shown, is operated and the measurement of the operation time of the compressor is started in step 1390. On the other hand, when the judgment result is "0", the finally determined control current value In is taken as substantially zero in step 1400. In step 1410, the timer is not operated and the operation time of the compressor remains zero. In the present embodiment, the finally determined control current value In is taken as the threshold value In-s in step 1380, but the present invention is not limited to this and a value near the threshold value In-s is possible.

In step 1420, intermittent control is carried out between the predetermined threshold value G-s and a substantially zero value until the counted operation time Tn reaches a predetermined time T1 (for example, about 60 seconds) and when the counted operation time Tn reaches the predetermined time T1 (for example, about 60 seconds), in step 1430, the flag is changed from ON to OFF. In other words, the ON/OFF control is switched to the continuous control. The control current value In at this time is taken as the threshold value In-s.

Among the above-mentioned steps, step 1370 to step 1410 is the ON/OFF control in which the finally determined control current value In is repeatedly changed between the threshold value In-s and a substantially zero value, and step 1420 and step 1430 are the judgment means for switching from the ON/OFF control to the continuous control.

Due to this, when the low flow rate of the temporary control current value In-0 is lower than the threshold value In-s, and until the operation time of the compressor 11 reaches the predetermined time T1, the ON/OFF control is being carried out in which, as shown in FIG. 8 and based on the actual discharged air temperature Te shown in (a) and the target discharge temperature TEO, the finally determined control current value In shown in (b) is repeatedly changed between the threshold value In-s and a substantially zero value. In other words, the discharge displacement of the compressor 11 changes based on the changes in the control current value In and as a result, the ON/OFF control is being carried out intermittently in which the compressor discharge flow rate shown in (c) is repeatedly changed between the predetermined threshold value G-s and a substantially zero value.

By intermittently controlling the flow rate of the predetermined threshold value G-s, it is possible to forcedly push back and circulate the oil that tends to gather in the rear seat evaporator 27 and in the refrigerant pipe on the outlet of the evaporator 27 to the compressor 11. Therefore, even when the compressor discharge flow rate, that is, the flow rate of the refrigerant circulating in the cycle, is low, the amount of oil returned to the compressor 11 can be ensured.

On the other hand, by intermittently controlling the compressor discharge flow rate at the flow rate of the predetermined threshold value G-s based on the judgment of high/low level of the actual discharged air temperature Te compared to the target discharge temperature TEO, the average flow rate is reduced and the discharged air temperature Te of the front seat evaporator 9 can be maintained at the target discharge temperature TEO, and thus the controllability of the discharged air temperature Te of the front seat evaporator 9 can be ensured. Further, the discharged air temperature Te of the rear seat evaporator 27 can also be controlled similarly to the control of the discharged air temperature Te of the front seat evaporator 9.

In the ON/OFF control, when the variations in the actual discharged air temperature Te become stable, by measuring the operation time of the compressor 11 and controlling it so that the control is switched to the continuous control when the operation time exceeds the predetermined time T1 (for example, about 60 seconds), the switching timing of the ON/OFF control is changed from a frequent one to a less frequent one.

In the present invention, therefore, until the predetermined time T1 (for example, about 60 seconds) is reached, the temperature variation of the front seat evaporator 9 is judged to be large and in this case, the ON/OFF control is kept on operating. Therefore, it is possible to smoothly switch the control to the continuous control as the switching is carried out after confirming that the temperature variation of the front seat evaporator 9 becomes small. Due to this, it is possible to follow the discharge flow rate in accordance with the degree of cooling of the front seat evaporator 9. In the refrigerating cycle and when, for example, the front seat temperature-sensitive expansion valve 14 changes its opening degree, a time required for the refrigerant to circulate the refrigerating cycle can be used instead of the predetermined time T1.

According to the refrigerating cycle device in the embodiment described above, when the flow rate of the circulating refrigerant is not higher than the predetermined threshold value G-s, the discharge flow rate of the compressor 11 is controlled so as to intermittently change between a discharge flow rate near the predetermined threshold value G-s and a discharge flow rate of substantially zero, and the operation time of the compressor during the period of the control is measured and the compressor is controlled continuously at the discharge flow rate near the predetermined threshold value G-s when the compressor operation time exceeds the predetermined time T1 and, thereby, if the operation time of the compressor 11 is confirmed in the ON/OFF control in which the discharge flow rate is changed intermittently, the switching from the intermittent control to the continuous control can be carried out smoothly because the evaporation temperature variation in the front seat evaporator 9 becomes slow. Due to this, it is possible to follow the discharge flow rate in accordance with the degree of cooling of the front seat evaporator 9 and the rear seat evaporator 27.

When the flow rate of the circulating refrigerant falls to lower than the predetermined threshold value G-s, conditions under which the lack of oil returned to the compressor 11 is likely to occur, are brought about. Therefore, the control is carried out so that the discharge flow rate is changed intermittently between a discharge flow rate near the predetermined threshold value G-s and a flow rate of substantially zero and it is possible to prevent the lack of oil returned to the compressor 11 by forcedly causing the lubrication oil gathering in the front seat evaporator 9 and the rear seat evaporator 27 and in the outlet pipes of the evaporators 9 and 27 to flow when the discharge flow rate is not lower than the predetermined threshold value G-s. Further, due to the flow at a discharge flow rate near the predetermined threshold value G-s, it is possible to prevent the liquid phase refrigerant from gathering at a specific portion in the refrigerant circuit inside each of the evaporators 9 and 27 and, thereby, the variations in the evaporator discharged air temperature Te can be reduced.

When the flow rate of the circulating refrigerant is not higher than the predetermined threshold value G-s, the discharge flow rate of the compressor 11 is maintained at a flow rate of a substantially zero value while the degree of actual cooling of each of the evaporators 9 and 27 is in the predetermined low temperature region and when the degree of actual cooling of the evaporators 9 and 27 moves to a high temperature region with temperature higher than the predetermined low temperature region, by controlling the discharge flow rate of the compressor at the discharge flow rate near the predetermined threshold value G-s, it is possible to maintain the degree of actual cooling of the evaporators 9 and 27 in a predetermined temperature region even if control is carried out intermittently in order to prevent the lack of oil return when the flow rate is below the threshold value G-s.

The compressor 11 has the control valve 11 for controlling the change in the discharge displacement and is a flow rate control type variable displacement compressor for variably controlling the discharge displacement using the control valve 110 so that the discharge flow rate is the target discharge flow rate. The target discharge flow rate is determined so that the degree of actual cooling of each of the evaporators 9 and 27 will be target degree of cooling and the air conditioning control unit 40 for directing a control signal in accordance with the target discharge flow rate is provided and the value of information relating to the flow rate of the circulating refrigerant is the value of the control signal. When it is judged that the flow rate of the circulating refrigerant is higher than the predetermined threshold value G-s based on the value of the control signal, the control signal is applied to the control valve 110 to control the discharge displacement and on the other hand, when it is judged that the flow rate of the circulating refrigerant is not higher than the predetermined threshold value G-s based on the value of the control signal, the value of the control signal is switched between a value corresponding to a discharge flow rate near the predetermined threshold value G-s and a value corresponding to a discharge flow rate of substantially zero to change the discharge displacement. In this manner, it is possible to prevent the lack of oil return by changing the discharge displacement in the refrigerating cycle device using the flow rate control type variable displacement compressor by switching the value between a value corresponding to a discharge flow rate near the predetermined threshold value G-s and a value corresponding to a discharge flow rate of substantially zero based on the control signal in accordance with the target discharge flow rate.

The control valve 110 produces a control pressure using the cycle high-pressure side pressure Pd and the control pressure controls the change in discharge displacement, and the flow rate of the circulating refrigerant in accordance with the control signal of the control valve 110 decreases as the cycle high-pressure side pressure rises, and it is possible to change the flow rate control without hindrance in order to prevent the lack of returned oil when the flow rate of the circulating refrigerant is low, by correcting so that the predetermined threshold value G-s increases as the cycle high-pressure side pressure rises even if the control valve 110 has the pressure-dependent control characteristic that the flow rate of the circulating refrigerant decreases in accordance with a rise in the cycle high-pressure side pressure.

The degree of actual cooling of each of the evaporators 9 and 27 corresponds to the actual discharged air temperature Te of each of the evaporators 9 and 27 and the target degree of cooling is the target evaporation temperature calculated based on the information value relating to the cooling heat load conditions and, therefore, as the information value relating to the cooling heat load conditions, the target discharge temperature TEO of air discharged to the vehicle compartment, the outside air temperature Tam, etc., can be used.

Further, the evaporators are plural evaporators 9 and 27 connected in parallel to each another and the compressor 11 is single, and the single compressor 11 circulates the refrigerant through the plural evaporators 9 and 27 and, therefore, in the refrigerating cycle device in which the plural evaporators 9 and 27 are connected in parallel, oil is likely to gather in the evaporator, among the plural evaporators 9 and 27, more distant from the compressor 11 when the flow rate is low, however, even in such a refrigerating cycle device, it is possible to effectively prevent the lack of returned oil when the flow rate is low by selecting a predetermined threshold value in accordance with the device.

One of the plural evaporators 9 and 27 is arranged in the front seat air conditioning unit 1 for air-conditioning the vehicle compartment front seat side and another of the plural evaporators 9 and 27 is arranged in the rear seat air conditioning unit 26 for air-conditioning the vehicle compartment rear seat side, therefore, even in such a refrigerating cycle device for a vehicle, it is possible to effectively prevent the lack of returned oil when the flow rate is low by selecting a predetermined threshold value G-s in accordance with the device.

Further, the predetermined threshold value G-s is the minimum flow rate of the circulating refrigerant at which the variations in the discharged air temperature Te of the evaporators 9 and 27, the pressure hunting of the compressor 11, and the oil return in the refrigerating cycle are in good condition and, therefore, when the flow rate is low, in addition to the lack of returned oil, there are problems such as pressure hunting and the variations in the discharged air temperature Te, however, it is possible to improve these characteristics by controlling the discharge flow rate to change intermittently as described above.

Second Embodiment

Figure 9:
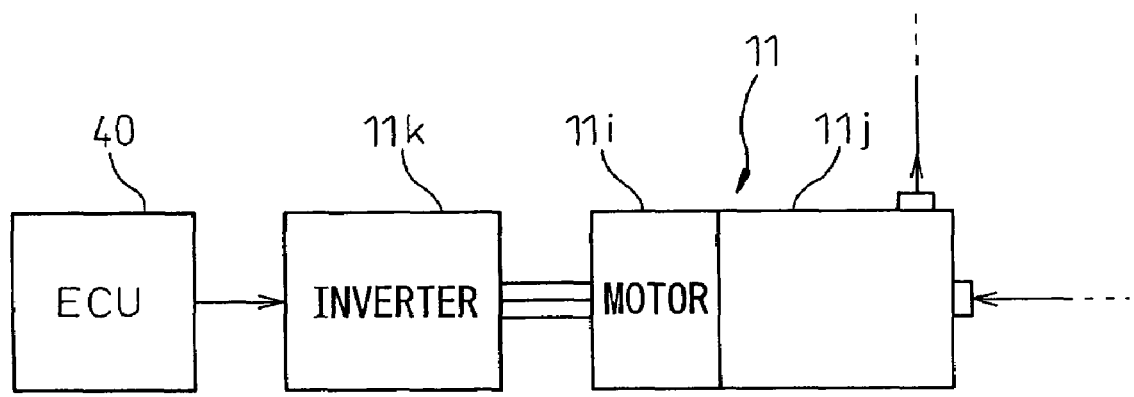
FIG. 9 is a block diagram showing a control relationship of an electric compressor 11 in a second embodiment of the present invention.

In the first embodiment described above, the present invention is applied to a variable displacement compressor capable of continuously and variably controlling the discharge displacement by the control signal from the outside, however, application is not limited to this and it is possible to use an electric compressor 11 as the compressor 11 as specifically shown in FIG. 9. The electric compressor 11 is formed by integrally forming an electric motor 11i and a compression portion 11j driven by the electric motor 11i. Specifically, the electric motor 11i is a three-phase AC motor and the compression portion 11j is, for example, a widely known scroll compressor.

By variably controlling the frequency of the three-phase AC power supply to the electric motor 11i by an inverter 11k, the rotation speed of the electric motor 11i is controlled and the refrigerant discharge flow rate of the electric compressor 11 can be increased or decreased in accordance with the rotation speed. Further, the inverter 11k is controlled by the control output of the air conditioning control unit 40, which is an electric motor control means. In other words, it may be possible to carry out the control of the first embodiment by replacing the magnitude of the refrigerant discharge flow rate with a control signal for the rotation speed.

Even in the case of the electric compressor 11 the discharge flow rate of which is controlled so as to be the target discharge flow rate by the control of the rotation speed of the electric motor 11i having the above-mentioned configuration, the same effect as that in the first embodiment can be obtained by carrying out the control to intermittently change the rotation speed of the electric motor 11i by switching the value of the control signal of the rotation speed between a value corresponding to a discharge flow rate in accordance with a discharge flow rate near the predetermined threshold value G-s and a value corresponding to a discharge flow rate of substantially zero when the flow rate of the circulating refrigerant is judged to be not higher than the predetermined threshold value G-s.

Other Embodiments

In the embodiments described above, the present invention is applied to the dual air conditioner type refrigerating cycle device 10 that circulates the refrigerant through the plural evaporators 9 and 27 by the single compressor 11, however, application is not limited to this and the present invention may be applied to the single air conditioner type refrigerating cycle device 10 comprising the single compressor 11 and the single evaporator 9.

In this case, in step 1320 shown in FIG. 6, the predetermined threshold value In-s may be smaller than the threshold value In-s of the dual air conditioner type. The case of the dual air conditioner type in which the threshold value In-s is, for example, a refrigerant flow rate of 60 kg/h, corresponds to the case of the single air conditioner type in which the threshold value may be a refrigerant flow rate of about 50 kg/h.

In the embodiments described above, in step 1370 shown in FIG. 6, a judgment is made based on the discharged air temperature Te of the evaporator 9, however, judgment is not limited to this and first a rate of change (derivative) of the discharged air temperature Te with respect to time is calculated, and then a judgment may be made according to the temperature gradient of the evaporator 9 based on the rate of change (derivative) of the discharged air temperature Te with respect to time. Alternatively, instead of the discharged air temperature Te, the surface temperature of the fin or tube of the evaporator 9 may be detected to determine the degree of cooling of the evaporator 9.

While the invention has been described by reference to specific embodiments chosen for the purposes of illustration, it should be apparent that numerous modifications could be made thereto, by those skilled in the art, without departing from the basic concept and scope of the invention.

The invention claimed is:

1. A refrigerating cycle device comprising:
   at least a compressor capable of changing the discharge flow rate; and
   an evaporator provided on a suction side of the compressor for evaporating a low-pressure refrigerant, wherein:
   whether or not flow rate of circulating refrigerant is higher than a predetermined threshold value is judged based on an information value relating to the flow rate of the circulating refrigerant in the refrigerating cycle device;

when the flow rate of the circulating refrigerant is higher than the predetermined threshold value, discharge flow rate of the compressor is controlled in accordance with a degree of cooling of the evaporator; and on the other hand, when the flow rate of the circulating refrigerant is not higher than the predetermined threshold value, the discharge flow rate of the compressor is controlled so as to intermittently change between a discharge flow rate near the predetermined threshold value and a flow rate of a substantially zero value and compressor operation time during a period of that control is measured and when the compressor operation time exceeds a predetermined time, the compressor is continuously controlled at a discharge flow rate near the predetermined threshold value.

2. The refrigerating cycle device as set forth in claim 1, wherein, when the flow rate of the circulating refrigerant is not higher than the predetermined threshold value, while a degree of actual cooling of the evaporator is in a predetermined low-temperature region, the discharge flow rate of the compressor is maintained at a flow rate of a substantially zero value, and when the degree of actual cooling of the evaporator moves to a high-temperature region with temperature higher than the predetermined low-temperature region, the discharge flow rate of the compressor is controlled at a discharge flow rate near the predetermined threshold value.

3. The refrigerating cycle device as set forth in claim 1, wherein:

the compressor is a flow rate control type variable displacement compressor having a control valve for controlling change in discharge displacement and variably controlling the discharge displacement by the control valve so that the discharge flow rate is a target discharge flow rate;

the target discharge flow rate is determined so that a degree of actual cooling of the evaporator is a target degree of cooling and a control means for directing a control signal in accordance with the target discharge flow rate is included;

the information value relating to the flow rate of the circulating refrigerant is a value of the control signal and when it is judged, based on the value of the control signal, that the flow rate of the circulating refrigerant is higher than the predetermined threshold value, the control signal is applied to the control valve to control the discharge displacement; and on the other hand, when it is judged, based on the value of the control signal, that the flow rate of the circulating refrigerant is lower than the predetermined threshold value, the discharge displacement is changed by switching the value of the control signal between a value corresponding to a flow rate near the predetermined threshold value and a value corresponding to a flow rate of substantially zero.

4. The refrigerating cycle device as set forth in claim 3, wherein:

the control valve produces a control pressure by using a cycle high-pressure side pressure and a change in the discharge displacement is controlled by the control pressure;

the flow rate of the circulating refrigerant in accordance with the control signal of the control valve decreases as the cycle high-pressure side pressure rises; and the predetermined threshold value is corrected so as to increase as the cycle high-pressure side pressure rises.

5. The refrigerating cycle device as set forth in claim 3, wherein the degree of actual cooling of the evaporator is an actual discharged air temperature of the evaporator and the target degree of cooling is a target evaporation temperature calculated based on the information values relating to cooling heat load conditions.

6. The refrigerating cycle device as set forth in claim 1, wherein:

the compressor is an electric compressor controlled so that the discharge flow rate is a target discharge flow rate by a control of the rotation speed of an electric motor;

the target discharge flow rate is determined so that a degree of actual cooling of the evaporator is a target degree of cooling and an electric motor control means for directing a control signal of the rotation speed corresponding to the target discharge flow rate is included;

the information value relating to the flow rate of the circulating refrigerant is a value of the control signal of the rotation speed and when it is judged, based on the value of the control signal of the rotation speed, that the flow rate of the circulating refrigerant is higher than the predetermined threshold value, the control signal of the rotation speed is applied to the electric motor to control the rotation speed of the electric motor; and on the other hand, when it is judged, based on the value of the control signal of the rotation speed, that the flow rate of the circulating refrigerant is not higher than the predetermined threshold value, the rotation speed of the electric motor is changed by switching a value of the control signal of the rotation speed between a value corresponding to a discharge flow rate near the predetermined threshold value and a value corresponding to a discharge flow rate of substantially zero.

7. The refrigerating cycle device as set forth in claim 1, wherein at least the evaporator is plural evaporators connected in parallel to each another and the compressor is single, and the single compressor circulates a refrigerant through the plural evaporators.

8. The refrigerating cycle device as set forth in claim 7, wherein the refrigerating cycle device is applied to a vehicle, one of the plural evaporators is arranged in a front seat air conditioning unit for air-conditioning the vehicle compartment front seat side and another of the plural evaporators is arranged in a rear seat air conditioning unit for air-conditioning a vehicle compartment rear seat side.

9. The refrigerating cycle device as set forth in claim 1, wherein the predetermined threshold value is a minimum flow rate of the circulating refrigerant at which variations in discharged air temperature of the evaporator, pressure hunting of the compressor, and an oil return in the refrigerating cycle are in a good condition.

* * * * *